United States Patent
Noguchi et al.

(10) Patent No.: US 12,066,911 B2
(45) Date of Patent: Aug. 20, 2024

(54) METHOD AND SYSTEM FOR TESTING OPERATION OF TARGET COMPUTER SYSTEM

(71) Applicant: MITSUBISHI ELECTRIC CORPORATION, Tokyo (JP)

(72) Inventors: Reiya Noguchi, Rennes (FR); Thierry Jeron, Le Chesnay-Rocquencourt (FR); Nicolas Markey, Paris (FR); Ocan Sankur, Paris (FR)

(73) Assignee: Mitsubishi Electric Corporation, Tokyo (JP)

( * ) Notice: Subject to any disclaimer, the term of this patent is extended or adjusted under 35 U.S.C. 154(b) by 73 days.

(21) Appl. No.: 17/919,340

(22) PCT Filed: Apr. 28, 2021

(86) PCT No.: PCT/JP2021/017786
§ 371 (c)(1),
(2) Date: Oct. 17, 2022

(87) PCT Pub. No.: WO2021/225180
PCT Pub. Date: Nov. 11, 2021

(65) Prior Publication Data
US 2023/0153216 A1    May 18, 2023

(30) Foreign Application Priority Data

May 6, 2020 (EP) ..................................... 20305452

(51) Int. Cl.
*G06F 11/00* (2006.01)
*G06F 11/22* (2006.01)
(Continued)

(52) U.S. Cl.
CPC .......... *G06F 11/27* (2013.01); *G06F 11/2273* (2013.01); *G06F 11/26* (2013.01); *G06F 11/3495* (2013.01)

(58) Field of Classification Search
CPC ...... G06F 11/2273; G06F 11/26; G06F 11/27; G06F 11/3495
See application file for complete search history.

(56) References Cited

U.S. PATENT DOCUMENTS

| | | | |
|---|---|---|---|
| 6,449,752 B1 * | 9/2002 | Baumgartner | G06F 30/3323 716/106 |
| 8,381,226 B2 * | 2/2013 | Kahlon | G06F 11/3604 717/131 |

(Continued)

OTHER PUBLICATIONS

Amalinda Post et al., "rt-Inconsistency: A New Property for Real-Time Requirements", Mar. 26, 2011, Big Data Analytics in the social and ubiquitous Context: 5th International workshop on modeling social media, MSM 2014, 5th International workshop on mining ubiquitous and social environments, muse 2014 and first International workshop on machine le, XP047432027, ISBN: 978-3-642-17318-9, pp. 34-43.

(Continued)

*Primary Examiner* — Joshua P Lottich
(74) *Attorney, Agent, or Firm* — Birch, Stewart, Kolasch & Birch, LLP

(57) ABSTRACT

The present disclosure relates to a method for testing the operation of a target computer system constrained by a set of timed requirements. For each of a plurality of subsets of the set, the method includes: searching for a witness trace satisfying a criterion for detecting a conflict between timed requirements of the subset; when a witness trace is found: searching for a contradicting timed requirement among the timed requirements of the set which are not present in the subset; when a contradicting timed requirement is found:

(Continued)

adding the contradicting timed requirement to the incremental subset. An inconsistency of the operation of the target computer system is detected when a witness trace is found for and no contradicting timed requirement is found.

9 Claims, 3 Drawing Sheets

(51) Int. Cl.
  *G06F 11/26* (2006.01)
  *G06F 11/27* (2006.01)
  *G06F 11/34* (2006.01)

(56) References Cited

U.S. PATENT DOCUMENTS

| | | | | |
|---|---|---|---|---|
| 2011/0131252 | A1* | 6/2011 | Son | H04L 41/12 707/E17.005 |
| 2011/0167412 | A1* | 7/2011 | Kahlon | G06F 11/3608 717/130 |
| 2011/0282640 | A1* | 11/2011 | Mohalik | G06F 30/3323 703/17 |
| 2012/0159250 | A1* | 6/2012 | Aull | G06F 11/3672 714/E11.02 |
| 2012/0185734 | A1* | 7/2012 | Gilkerson | G06F 9/30123 714/45 |
| 2015/0254115 | A1* | 9/2015 | Kuroda | G06F 11/323 719/318 |

OTHER PUBLICATIONS

International Search Report for PCT/JP2021/017786 (PCT/ISA/210) mailed on Jul. 9, 2021.

P. Janssen et al., "A Filtering Process for General Constraint-Satisfaction Problems: Achieving Pairwise-Consistency Using an Associated Binary Representation", Tools for Artificial Intelligence, 1989, Architectures Languages and Algorithms, IEEE International workshop on fairfax, VA, USA Oct. 23-25, 1989, Los Alamitos, CA, USA, IEEE Comput. Soc, US, Oct. 23, 1989, pp. 420-427.

Vincent Langenfeld et al., "Scalable Analysis of Real-Time Requirements", 2019 IEEE 27th International Requirements Engineering Conference(RE), IEEE, Sep. 23, 2019, pp. 234-244.

Written Opinion of the International Searching Authority for PCT/JP2021/017786 (PCT/ISA/210) mailed on Jul. 9, 2021.

* cited by examiner

METHOD AND SYSTEM FOR TESTING OPERATION OF TARGET COMPUTER SYSTEM

TECHNICAL FIELD

This disclosure relates to requirement engineering for computer systems and relates more specifically to a method and system for testing the operation of a target computer system by using timed requirements.

BACKGROUND ART

In the process of developing computer systems, requirement engineering consists in defining, documenting and maintaining the requirements that a computer system needs to comply with. Requirements can be of different nature but, in computer systems, timed requirements are of importance. Basically, a timed requirement corresponds to constraints, including timing constraints, between outputs of the computer system and inputs to said computer system. In practice, timed requirements will be the basis of the design and development of the computer system. Also, timed requirements will partly drive the testing campaign in order to check that they are indeed complied by the actual computer system, once developed.

Of course, it is of primary importance to design timed requirements that are consistent, i.e. that are not contradictory such that implementations conforming with said timed requirements are indeed possible and may be designed and developed.

In the scientific literature, there exist different consistency notions defined for real-time systems' timed requirements.

For instance, real-time consistency (a.k.a. rt-consistency) [PHP11] requires that all finite execution sequences that do not already violate some timed requirement have an extension that satisfies all of them. Put differently, this means that if an implementation produces a finite execution sequence whose all continuations necessarily lead to the violation of some timed requirement, then there must be a timed requirement that is already violated by the finite execution sequence. Thus, rt-consistency ensures that the set of timed requirements is well designed and sane. This notion of consistency is interesting in that it may catch subtle problems in the set of timed requirements, but it is rather computationally expensive to check.

Another example corresponds to partial consistency [Bec19], which is a weaker notion of consistency that only considers conflicts between pairs of timed requirements. In practice, partial consistency checking is usually restricted to execution sequences of bounded length, but it may still detect important flaws in the specifications of the timed requirements. The general motivation is to gain in efficiency by restricting to pairs of timed requirements, but also by focusing on situations where inconsistencies may arise. The computational complexity for checking partial consistency is lower than for checking rt-consistency, even if it can remain computationally expensive in some cases. However, one should be aware that focusing on pairs might introduce false negatives (considering that the set is not inconsistent while it is inconsistent), since consistency of pairs of requirements does not imply consistency of the whole set timed requirements, since inconsistencies can be introduced by adding a new timed requirement. Conversely, focusing on pairs might also produce false positives (considering the set is inconsistent while it is consistent), since an inconsistency of a pair of requirements can be removed by adding a new timed requirement of the set which prevents the execution sequence revealing the inconsistency to occur.

SUMMARY OF INVENTION

The present disclosure aims at proposing a solution for checking the consistency of a set of timed requirements describing the operation of a target computer system which is computationally less expensive than rt-consistency checking and provides a more accurate assessment of the consistency of the set of timed requirements than (bounded) partial consistency checking.

According to a first aspect, the present disclosure relates to a computer implemented method for testing the operation of a target computer system, said operation of the target computer system being constrained by a set of timed requirements, wherein said method comprises defining subsets of timed requirements of the set, and for each subset of a plurality of subsets, iterating steps of:
- searching for an execution sequence of the target computer system, referred to as witness trace, satisfying a criterion for detecting a conflict between timed requirements of the subset;
- when a witness trace is found: searching for a contradicting timed requirement among the timed requirements of the set which are not present in the subset, which prevents the witness trace to occur when considered with the subset;
- when a contradicting timed requirement is found: augmenting the subset by including the contradicting timed requirement in the subset;

wherein an inconsistency of the operation of the target computer system constrained by the set of timed requirements is detected when a witness trace is found for at least one subset and no contradicting timed requirement is found for said witness trace.

Hence, the testing method aims at evaluating the operation of a target computer system. The target computer system may be any computer system for which timed requirements may be defined, such as an embedded electronic system and/or mechatronic system and/or a mechanical control system, etc.

The operation of the target computer system is constrained by a set of timed requirements. Testing the operation of the target computer system corresponds to simulating the behavior of the target computer system at the timed requirement level, in order to detect inconsistencies among the timed requirements. Hence, it is emphasized that the testing method does not interact with the actual target computer system, which may not be designed or developed yet, but evaluates the operation of the target computer system by simulating its behavior at the timed requirement level. Accordingly, the testing method is carried out by a testing computer system that is different from the target computer system.

As discussed above, a timed requirement may be viewed as constraints, including timing constraints, between outputs of the target computer system and inputs to said target computer system. A timed requirement may be modeled by a set of possible states of the target computer system, with at least one error state, together with possible transitions between states and the associated timing constraints.

The testing method searches for execution sequences of the target computer system, referred to as "witness trace", that may lead to conflicts between timed requirements, i.e. that may lead to at least one timed requirement being violated. An execution sequence basically corresponds a sequence of inputs to the target computer system and resulting outputs from said target computer system at successive time steps. At least one timed requirement is violated when the constraints it defines cannot be satisfied at some point during an execution sequence. It should be noted that the witness trace itself does not violate a timed requirement yet. However, the witness trace is not prevented to occur by the considered timed requirements and yet it reaches a configuration of the target computer system from which at least one timed requirement will be violated at some point.

The testing method searches for witness traces satisfying a criterion for detecting a conflict between timed requirements. Basically, the conflict detection criterion may use different notions of inconsistency checking, such as rt-inconsistency checking or partial inconsistency checking. Detailed examples of conflict detection criteria are provided hereinbelow.

The testing method searches for witness traces in an iterative manner, by searching for witness traces in subsets of the original set. Basically, a witness trace is searched for in a subset of the set of timed requirements, i.e. the witness trace complies with the timed requirements of the subset in that it is not prevented to occur by said timed requirements, but it reaches a configuration of the target computer system from which at least one timed requirement of the subset will be violated at some point.

If a witness trace for a subset is found (i.e. an inconsistency of the subset is detected), then a further check on the witness trace is performed by searching for a contradicting timed requirement in the remaining timed requirements of the set, i.e. in the timed requirements of the set that are not present in the considered subset. Basically, a contradicting timed requirement corresponds to a timed requirement which prevents the witness trace to occur when considered with the considered subset. Hence the contradicting timed requirement is a timed requirement that is violated by the witness trace before the end of the witness trace. In other words, if a contradicting timed requirement is found for the witness trace, this means that the inconsistency detected in the considered subset by the witness trace is in fact a false positive, that is therefore discarded.

When such a contradicting timed requirement is found, then it is added to the considered subset, and the testing method resumes to searching for a witness trace in the augmented subset. When no contradicting timed requirement is found, then the inconsistency detected is confirmed.

An inconsistency of the set of timed requirements is detected when a witness trace is found for at least one subset and no contradicting timed requirement is found for said witness trace. It should be noted that, if the subset has augmented up to a size $N_{TR}$, then the subset is identical to the original set and all the timed requirements are included in the subset, such that if a witness trace is found, it is not possible to find a contradicting timed requirement.

It is possible to consider that no inconsistency is detected when no witness traces are found for the subsets.

When augmenting the subsets, it is possible to set a higher bound on the size of the subset. Enhanced accuracy may be achieved if the higher bound is set to the number $N_{TR}$ of timed requirements of the set. However, it is also possible to consider a higher bound $K_{TRmax}$, lower than $N_{TR}$ in order to control the computational complexity required for searching for witness traces in a subset.

This iterative process allows to quickly find inconsistencies after a few iterations. Inconsistencies often depend on several timed requirements but not on all of them. While previous approaches required considering all timed requirements at once (which does not scale), or they would only consider pairs of timed requirements (which might lead to false positives or false negatives).

The present solution checks several subsets of timed requirements of growing size, which proves more efficient from a computational standpoint, and enables detecting more inconsistencies while discarding false positives. Indeed, increasing the size of a subset is not systematic and is only required when a witness trace is found for the subset and a false positive is detected.

In specific embodiments, the testing method can further comprise one or more of the following features, considered either alone or in any technically possible combination.

In specific embodiments, the conflict detection criterion is expressed using Computation Tree Logic, CTL, and searching for a witness trace uses a model checking tool. The advantage of CTL model checking is to be able to check a complex conflict detection criterion (expressed in CTL) rather than designing a specific algorithm for the task in hand. Moreover, this check can be done efficiently for timed automata with Boolean variables, by using e.g. Binary Decision Diagrams, BDD, based model checking.

In specific embodiments, searching for a witness trace uses a Satisfiability Modulo Theories, SMT, solver. Such SMT solvers are efficient in finding variable assignments satisfying given constraints. They prove very efficient in bounded model checking, which consists in checking traces of bounded length, and thus searching for witness traces of bounded length.

In specific embodiments, each timed requirement is modeled as a timed automaton. Timed automata can model complex timed requirements and can be checked efficiently using state-of-the-art model checkers.

In specific embodiments, each timed requirement is modeled as a Simplified Universal Pattern, SUP. SUPs are a restricted class of timed requirements, for which computationally efficient specific consistency checking tools exist.

According to a second aspect, the present disclosure relates to a computer program product comprising instructions which, when executed by at least one processor, configure said at least one processor to carry out a testing method according to any one of the embodiments of the present disclosure.

According to a third aspect, the present disclosure relates to a computer-readable storage medium comprising instructions which, when executed by at least one processor, configure said at least one processor to carry out a testing method according to any one of the embodiments of the present disclosure.

According to a fourth aspect, the present disclosure relates to a testing computer system for testing the operation of a target computer system, said testing computer system comprising at least one processor configured to carry out a testing method according to any one of the embodiments of the present disclosure.

The invention will be better understood upon reading the following description, given as an example that is in no way limiting, and made in reference to the figures.

DESCRIPTION OF EMBODIMENTS

Figure 1:
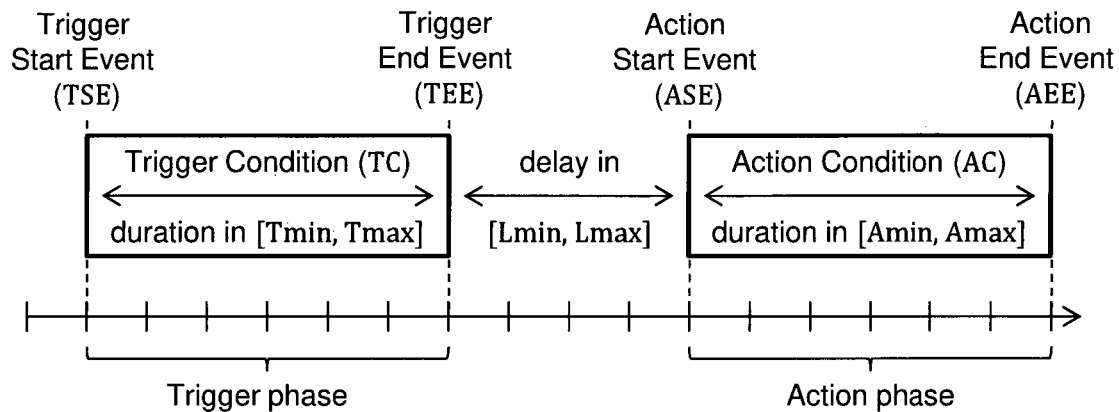
FIG. 1 shows a schematic representation of a timed requirement modeled as a Simplified Universal Pattern, SUP.

In these figures, references identical from one figure to another designate identical or analogous elements. For reasons of clarity, the elements shown are not to scale, unless explicitly stated otherwise.

As discussed above, the present disclosure relates to a method 50 and system for testing the operation of a target computer system by searching for inconsistencies between timed requirements of a set of timed requirements the target computer system must comply with.

We first introduce some definitions and conventions used in the following non-limitative description, and then we present the main steps of the testing method and different preferred embodiments of the testing method 50.

A. Definitions

We consider target computer systems (such as Programmable Logic Controllers or PLCs) whose behaviors are driven by the observation of Boolean variables and are subject to discrete timing constraints. Intuitively, a run of the target computer system can be understood as a sequence of time steps at which the value of Boolean variables is observed, the evolution of the target computer system being governed by both timing constraints and the Boolean value of these Boolean variables.

For this kind of target computer systems, timed requirements can for example be represented by timed automata such as those described in [AD90], with specific restrictions, but extended with Boolean variables. In subsection A.1, we introduce a formal definition of deterministic discrete timed automata with Boolean variables. In subsection A.2, we discuss execution sequences of a set of timed requirements. In subsection A.3, we introduce the notion of Simplified Universal Patterns (SUP) [Bec19] and show how timed requirements can be represented by this form of timed automata.

A.1. Timed Automata

Timed automata (TA) [AD90] extend finite-state automata with variables, called clocks, that can be used to measure (and impose constraints on) delays between various events along executions. More precisely, given a set $x = \{c_i | 1 \leq i \leq k\}$ of clocks, the set of allowed constraints is defined using the following grammar:

$$c(x) \ni g ::= c \sim n | g \wedge g$$

where c ranges over $x$, n ranges over $\mathbb{N}$, ~ranges over $\{<, \leq, =, \geq, >\}$, and the operator $\wedge$ corresponds to the logical "AND". We consider integer-valued clocks. The semantics of such clock constraints may be defined as follows: given a clock valuation v: $x \to \mathbb{N}$, that a constraint $g \in c(x)$ holds true at v, denoted $v \models g$, is defined inductively as follows:

$v \models g \sim n$ if, and only if, $v(c) \sim n$ $v \models g_1 \wedge g_2$ if, and only if, $v \models g_1$ and $v \models g_2$.

For a valuation v: $x \to \mathbb{N}$, an integer $d \in \mathbb{N}$, and a subset $R \subseteq x$, we let:

$v+d: x \to \mathbb{N}$ $v[R \leftarrow 0]: x \to \mathbb{N}$ $c \mapsto v(c)+d$ $c \in R \mapsto 0$ $c \notin R \mapsto v(c)$ Finally, we let 0 be the valuation mapping all variables to 0.

In our timed automata, we also consider the observation of the evolution of the target computer system through the values of Boolean variables. We thus consider a set $AP=\{b_i | 1 \leq i \leq n\}$ of atomic propositions, and we define the set of Boolean constraints $\mathcal{B}(AP)$ as the set of all propositional formulas built on AP. Notice that those Boolean variables cannot be modified, but are only observed, since they belong to the target computer system itself, contrary to clocks that can be reset since they are owned by the timed requirement only and used by it to check timing constraints.

A timed automaton is a tuple $\mathcal{T} = \langle S, S_0, AP, x, T, E \rangle$ where S is a finite set of states, $S_0 \subseteq S$ is a set of initial states, AP is a finite set of atomic propositions, $x$ is a finite set of clocks, $T \subseteq S \times \mathcal{B}(AP) \times c(x) \times 2^x \times S$ is a finite set of transitions, and $E \subseteq S$ is a subset of error states from which one cannot escape, i.e. for any t=(s, c, g, r, s') $\in$ T, if $s \in E$ then also $s' \in E$.

For a transition t=(s, c, g, r, s')$\in$T of a timed automaton, we define src(t)=s, tgt(t)=s', bool(t)=c, guard(t)=g, and reset(t)=r. Basically, t=(s, c, g, r, s') denotes a transition from src(t)=s to tgt(t)=s' that is available if the valuation of Boolean variables satisfies the boolean guard bool(t)=c and the valuation of clock variables satisfies the clock guard guard(t)=g. After the transition t, the value of each clock contained in the subset of clock variables reset(t)=r is reset to 0. Note that guards are pairs of Boolean and timed guards that can be interpreted (and will be noted) as conjunctions since the two types of guard do not interfere. Intuitively, error states are entered when the timed requirement is violated, and this is definitive. All other states can be considered accepting, meaning that no violation has been detected yet. This will be formalized later.

A configuration of a timed automaton is a pair (s, v) where $s \in S$ and $v \in \mathbb{N}^x$. With a timed automaton $\mathcal{T}$, we associate the infinite-state automaton $\mathcal{S}(\mathcal{T}) = \langle Q, Q_0, \Sigma, D, \Omega \rangle$ where:

the set of states Q contains all configurations (s, v)$\in$ $S \times \mathbb{N}^x$;

the initial states are obtained by adjoining the null valuation (all clocks are mapped to zero) to initial states $S_0$, i.e. $Q_0 = S_0 \times 0$;

$\Sigma = 2^{AP}$ is the alphabet of actions, i.e. valuations of all Boolean variables;

transitions in D are combinations of a transition of the timed automaton and a 1-time-unit delay. Formally, given a letter $\sigma \in \Sigma$ and two configurations (s, v) and (s', v'), there is a transition ((s, v), $\sigma$, (s', v')) in D if, and only if, there is a transition (s, c, g, r, s') in T such that:

$\sigma \models c$ and $v \models g$;

$v' = (v[r \leftarrow 0]+1)$;

$\Omega = E \times \mathbb{N}^x$ is the set of error configurations.

A run of $\mathcal{T}$ is a run of its associated infinite-state automaton $\mathcal{S}(\mathcal{T})$. It can be represented as a sequence along which configurations and actions alternate:

$(s_0, v_0) \cdot \sigma_1 \cdot (s_1, v_1) \cdot \sigma_2 \ldots (s_n, v_n) \ldots$ An execution sequence (or trace) of this sequence is its projection on the set of actions. In other terms, it is a finite or infinite sequence $\sigma=\{\sigma_i\}_{0\leq i\leq l}$ of actions where $l\in\mathbb{N}\cup\{+\infty\}$ is the length of $\sigma$, denoted with $|\sigma|$. Finite traces belong to $\Sigma^*$ and infinite ones to $\Sigma^\infty$. A trace is accepted by $\mathcal{T}$ if there is a run on that trace that never enters any error state.

It should be noted that the transition system $\mathcal{S}(\mathcal{T})$ is infinite because we impose no bound on the values of the clocks during executions. However, as is classical in the setting of timed automata [AD90], we may notice that the exact value of a clock is irrelevant as soon as it exceeds the largest integer constant with which it is compared. We could thus easily modify the definition of $\mathcal{S}(\mathcal{T})$ in such a way that it only contains finitely many states.

In the sequel, we consider in a non-limitative manner that the timed automata are complete, meaning that from any (reachable) configuration (s, v), and for any subset $\sigma$ of AP, there is a transition t=(s, c, g, r, s') in T such that of $\sigma|=c$ and $v|=g$. This is no loss of generality since we may have self-loops if we want to let more time elapse, and we may add the missing transitions to the error states. Also, the timed automaton are considered to be deterministic, i.e. for any two configurations (a, c, g, r, s) and (a, c', g', r', s') (hence starting from the same state a) such that both $c\wedge c'$ and $g\wedge g'$ are satisfiable, then s=s' and r=r'.

In the sequel, we will need to consider several timed requirements, each of them specified by a timed automaton. To this aim, we define the product of timed automata. Formally, given two timed automata $\mathcal{T}_1=(S_1, S_{1,0}, AP_1, x_1, T_1, E_1)$ and $T_2=(S_2, S_{2,0}, AP_2, x_2, T_2, E_2)$ with disjoint clock sets (i.e., $x_1\cap x_2=\emptyset$), their product $x_1\otimes x_2$ is a timed automaton $x=(S, S_0, AP, x, T, E)$ where $S=S_1\times S_2$, $S_0=S_{1,0}\times S_{2,0}$, $AP=AP_1\cup AP_2$, $x=x_1\cup x_2$, $E=E_1\times S_2\cup S_1\times E_2$, and the set of transitions is defined as follows: there is a transition $((s_1, s_2), c, g, r, (s'_1, s'_2))$ in T if there are transitions $(s_1, c_1, g_1, r_1, s'_1)$ in $T_1$ and $(s_2, c_2, g_2, r_2, s'_2)$ in $T_2$ with $c=c_1\wedge c_2$, $g=g_1\wedge g_2$, and $r=r_1\cup r_2$.

Note that in this definition, clocks of factor timed automata are disjoint, while atomic propositions are not, which may create interferences in guards of the product, and possibly inconsistencies. Also note that the product falls in an error state of E as soon as one of its factors does in $E_1$ or $E_2$, and if, as assumed above, no transition is leaving $E_1$ and $E_2$, this assumption is preserved on E. This product of timed automata can be easily generalized to an arbitrary number of timed automata, and timed requirements that they specify. For a set $\mathcal{R}=\{R_i\}_{i\in I}$ of timed requirements, each specified by a timed automaton $\mathcal{T}_i(R_i)$, we note $\otimes\mathcal{R}$ the timed requirement specified by the timed automaton $\otimes_{i\in I}T_i(R_i)$.

A.2. Execution Sequences

In the remainder of the present description, we consider, in a non-limitative manner, complete deterministic timed automata with error states that cannot be escaped. Notice that those properties are preserved when composing several timed automata. We use timed automata to encode timed requirements. Intuitively, entering an error state of a timed automaton corresponds to violating the corresponding timed requirement.

In the sequel, for any timed automaton $\mathcal{T}$ and any finite or infinite execution sequence (also referred to as "trace") $\sigma$, we write $\sigma|=$ ("$\sigma$ satisfies $\mathcal{T}$") if, and only if, $\sigma$ does not violate $\mathcal{T}$, i.e. running $\sigma$ on $\mathcal{T}$ does not visit E.

It should be noticed that for a finite trace $\sigma$, $\sigma|=\mathcal{T}$ simply means that the timed requirement has not been violated, but it could be the case that all infinite continuations of the trace $\sigma$ inevitably lead to E. To distinguish this case, we define the notation for $|\approx$ finite traces, which is stronger than $|=$. Hence, for a finite trace $\sigma$, and a timed automaton $\mathcal{T}$, we write $\sigma|\approx\mathcal{T}$ if there exists an infinite trace $\sigma'$ such that $\sigma\cdot\sigma'|=\mathcal{T}$.

Those configurations that are not yet erroneous but inevitably lead to an error state (i.e. those configurations reached by some finite traces $\sigma$ such that $\sigma|=\mathcal{T}$ but $\sigma|\not\approx\mathcal{T}$) are all configurations InevE that satisfy the Computation Tree Logic, CTL, formula $\neg err\wedge AFerr$ where err is the proposition that is true in E and false otherwise. Configurations in InevE witness the inconsistency of the timed automaton. In fact, the timed automaton should already have detected that there is no possible continuation satisfying the timed requirement and it should already be in an error state.

For a given trace $\sigma$, and set of timed automata $\mathcal{R}=\{\mathcal{T}_i\}_{i\in I}$, we write $\sigma|=\mathcal{R}$ (resp. $\sigma|\approx\mathcal{R}$) to mean that $\sigma|=\otimes\mathcal{R}$ (resp. $\sigma|\approx\otimes\mathcal{R}$). It should be noted that, given $\mathcal{R}'\subseteq\mathcal{R}$, then for any finite trace $\sigma$, if $\sigma|=\mathcal{R}$, then $\sigma|=\mathcal{R}'$ and if $\sigma|\approx\mathcal{R}$ then $\sigma|\approx\mathcal{R}'$.

A.3. Simplified Universal Patterns (SUP)

In this subsection, we describe a pattern language called Simplified Universal Pattern (SUP) [Bec19] that can be used to define timed requirements. Compared to timed automata, SUPs offer a more intuitive though less expressive way of writing timed requirements. All SUPs can be written as timed automata, but not all timed automata can be written using SUPs. We consider both timed automata and SUP requirements since SUPs have been used previously, and we propose some specific embodiments that hold only for SUPs, and some specific embodiments that hold more generally for timed automata, etc.

SUP instances can be denoted by:

$$(TSE, TC, TEE)[Tmin, Tmax] \xrightarrow{[Lmin, Lmax]} (ASE, AC, AEE)[Amin, Amax].$$

A SUP instance is thus defined by the choice of the Boolean formulas TSE, TC, TEE, ASE, AC, AEE, and durations Tmin, Tmax, Lmin, Lmax, Amin, Amax. The Boolean formulas are propositional formulas built from system Boolean variables in a set AP of atomic propositions. For simplicity, when talking about an individual SUP, we gather the values of these parameters in a vector P, and refer to its elements using the names of the parameters (e.g. $P_{TSE}$ is the value of the first parameter TSE). But we should remember that they are valuations of formulas, and when several SUPs are considered, since they may refer to some common Boolean variables, their valuations may interfere on those variables.

FIG. 1 illustrates the intuitive semantics of SUP. Intuitively, the left part of a SUP defines a trigger phase, while the right part is the action phase. For a trigger phase to be realized, TSE ("Trigger Start Event") has to be true, and then confirmed within a duration in [Tmin, Tmax]. Confirmation means that TC ("Trigger Condition") holds until TEE ("Trigger End Event") occurs. Otherwise the trigger is aborted.

If the trigger phase is realized, for the SUP to be satisfied, its action phase should be started by ASE ("Action Start Event") within [Lmin, Lmax] time units, and then confirmed. That an action phase is realized is defined as for triggers, with a confirmation duration within [Amin, Amax], during which both AC ("Action Condition") holds until AEE ("Action End Event") occurs. Otherwise, the SUP is violated.

Figure 2:
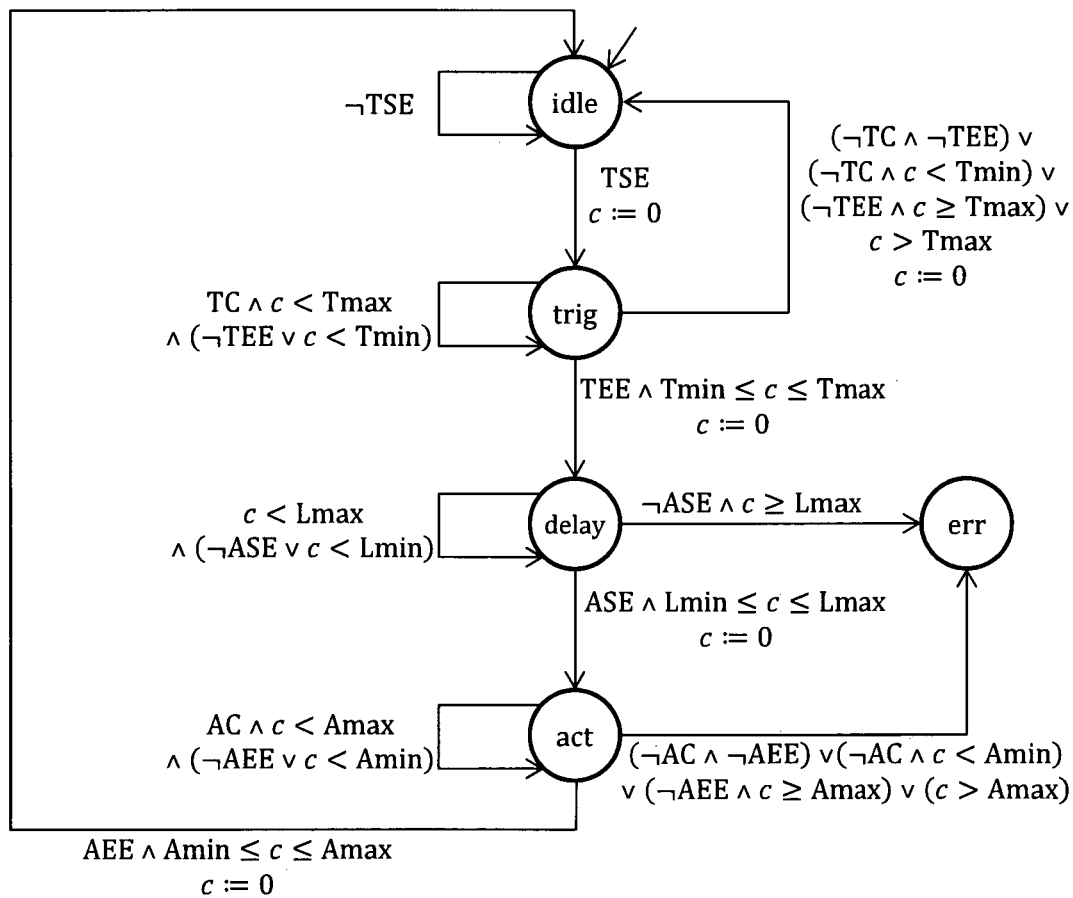
FIG. 2 shows a schematic representation of an exemplary timed requirement modeled as a timed automaton.

FIG. 2 represents schematically an example of deterministic timed automaton that can be used to encode a SUP timed requirements, since a SUP timed requirement is a special case of a timed automata as defined above.

As can be seen in FIG. 2, the timed automaton encoding the SUP timed requirement has five states idle, trig, delay, act and err (wherein err is the only error state), and an associated clock c. Also, in FIG. 2, the operator v corresponds to the logical "OR" and the operator ¬ corresponds to the logical operator "NOT".

This timed automaton clearly exhibits the successive phases of a SUP. However, the real timed automaton we use to encode a SUP is the transitive closure of the timed automaton depicted on FIG. 2. For instance, if both TSE and TEE hold true at the same time and Tmin=0, then the transitions from idle to trig and from trig to delay have to be taken at the same time. All maximal simple (i.e. where no transitions may appear twice) sequences of transitions have to be merged this way, provided that the conjunctions of their Boolean constraints and clock guards (taking intermediary clock resets into account) can be satisfied.

Example 1

Consider the $SUP(p, p, p)[0, 0] \xrightarrow{[0,1]} (q, q, q)[0, 0]$.

In words, this SUP is triggered by a single occurrence of p, and it is satisfied if each such occurrence of p is followed, within one time unit, by an occurrence of q. For such a SUP (where $P_{TSE}=P_{TC}=P_{TEE}$, and/or where $E_{ASE}=P_{AC}=P_{AEE}$), we simplify the notations and write:

$$p[T\min, T\max] \xrightarrow{[L\min, L\max]} q[A\min, A\max].$$

We also omit to mention the intervals if they are [0, 0], such that the SUP above can be written $$p \xrightarrow{[0,1]} q,$$

and it is satisfied e.g. along a trace where p holds true at each step and q is fulfilled at every other step.

Given a SUP requirement R, and a trace σ, we write σ|=R (resp. σ|≈R) to mean that a timed automaton $\mathcal{T}$ encoding R satisfies σ|=$\mathcal{T}$ (resp. σ|≈$\mathcal{T}$). In the rest of the present description, a timed requirement refers either to a timed automaton or to a SUP.

A.4. Several Notions of Consistency

{A.4.1. Rt-Consistency}

We consider the rt-consistency notion introduced in [PHP11]. As we already mentioned, consistency for a single timed automaton $\mathcal{T}$ amounts to requiring that InevE=E. This asks that errors be detected as soon as they cannot be avoided. In simple terms, rt-consistency ensures that this property is true for a set of timed requirements, that is, in the product of the timed automata that encode it.

Let $\mathcal{R}$ be a set of requirements. Then $\mathcal{R}$ is rt-consistent if, and only if, for all finite traces σ satisfying σ|=$\mathcal{R}$, we have σ|≈$\mathcal{R}$.

Thus, the set $\mathcal{R}$ is rt-consistent if all finite traces satisfying all timed requirements in $\mathcal{R}$ (i.e. not yet violating one of the timed requirements) can be extended to an infinite trace satisfying all requirements in $\mathcal{R}$. In other words, for all finite traces σ:

$$\sigma|=\mathcal{R} \Rightarrow \sigma|\approx \mathcal{R}$$

In fact, even if individual timed requirements are consistent alone (∀σ, α|=R⇒σ|≈R for each R∈ $\mathcal{R}$ ), this may not be the case for their conjunction. Thus, checking rt-consistency means checking the consistency of the conjunction of given timed requirements. Note also that the notion of rt-consistency is simply a generalization of consistency to a set of requirements.

Example 2

Consider the following two timed requirements:

$$P1: \text{request} \xrightarrow{[3,4]} \text{response}$$

$$P2: \text{repair} \xrightarrow{[5,5]} ! \text{response} [3, 3].$$

The first timed requirement models a target computer system that has to respond to any request within 3 to 4 time units. The second timed requirement states that if the target computer system enters a maintenance phase, then it will be off (and cannot respond) after 5 time units, and for a duration of 3 time units.

Figure 3:
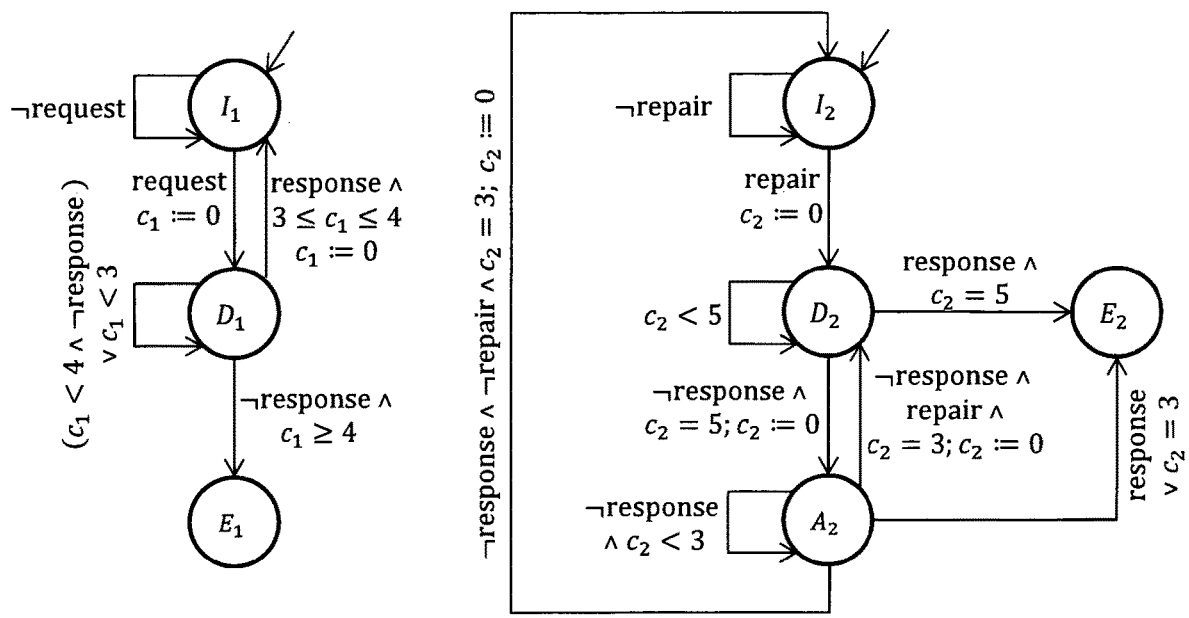
FIG. 3 shows a schematic representation of two exemplary timed requirements modeled as timed automata.

FIG. 3 represents the timed automata encoding those two SUPs.

As can be seen in FIG. 3, the timed automaton encoding the timed requirement P1 has three states $I_1$, $D_1$ and $E_1$ (wherein $E_1$ is the only error state), and an associated clock $c_1$. The timed automaton encoding the timed requirement P2 has four states $I_2$, $D_2$, $A_2$ and $E_2$ (wherein $E_2$ is the only error state), and an associated clock $c_2$. These timed requirements are not rt-consistent. Indeed, consider a finite trace σ where the repair signal is received, followed 3 time units later with a request. Then σ|=SUP(P1)∧SUP(P2). The joint runs of the automata are as follows:

$$\begin{pmatrix} I_1 \\ c_1 = 0 \\ I_2 \\ c_2 = 0 \end{pmatrix} \xrightarrow[(+delay)]{repair} \begin{pmatrix} I_1 \\ c_1 = 1 \\ D_2 \\ c_2 = 1 \end{pmatrix} \xrightarrow[(+delay)]{*} \begin{pmatrix} I_1 \\ c_1 = 2 \\ D_2 \\ c_2 = 2 \end{pmatrix} \xrightarrow[(+delay)]{*} \begin{pmatrix} I_1 \\ c_1 = 3 \\ D_2 \\ c_2 = 3 \end{pmatrix} \xrightarrow[(+delay)]{request} \begin{pmatrix} D_1 \\ c_1 = 1 \\ D_2 \\ c_2 = 4 \end{pmatrix}.$$

From this last configuration, it can be checked that no continuations of this trace will avoid reaching $E_1$ or $E_2$. Indeed, from the last configuration above, both timed automata will first loop in their current states $D_1$ and $D_2$, reaching configuration ($D_1$, $c_1$=2, $D_2$, $c_2$=5). In order to avoid visiting $E_2$, the next two steps must satisfy ¬ response, thereby reaching configuration ($D_1$, $c_1$=4, $A_2$, $c_2$=2). From that configuration, we have a conflict: if response is true at the next step, the run will reach $E_2$ in the second timed automaton, while if response is false (i.e. ¬ response is true), $E_1$ will be reached in the first timed automaton.

Now, assume we add the following timed requirement, which expresses that no request can be received during maintenance:

P3: repair→!request[5,5].

This timed requirement P3 rules out the above trace, i.e. it prevents the above trace to occur, and it can be checked that the resulting set of requirements is rt-consistent.

As will be seen in section B below, checking rt-consistency is in general computationally expensive. Several possibilities can be investigated to fight against this complexity:

First, one can restrict the considered class of timed requirements, while still having enough expressive power for targeted applications, and this is the idea of focusing on SUP requirements for which computationally efficient tools exist;

Second, one can restrict consistency checking to subsets of requirements. However, one should be aware that this might introduce false negatives: consistency of a subset does not imply consistency of the whole set, since inconsistencies can be introduced by adding a new requirement. Conversely, adding requirements may also introduce false positives: an inconsistency of a subset can be removed by adding a new requirement which prohibits some behaviors revealing an inconsistency (as for requirement P3 in the example above). We will however explore this idea, and see that some additional checks are necessary to avoid these situations;

Third, inconsistencies typically arise in some particular risky situations where Boolean valuations conflict. Some of these situations may in particular be identified for the restricted class of SUPs, where they correspond to conflicts between action parts of SUPs. This check can also be restricted to subsets or even pairs of timed requirements. Again, one should be aware that false negatives may arise (absence of particular risky situations on pairs does not imply consistency), as well as false positives (risky situations are not necessarily rt-inconsistencies). Again, additional conditions must be checked to get conclusions.

The present disclosure relates inter alia to these developments.

{A.4.2. Partial Consistency}

Partial consistency was introduced in [Bec19] as a partial but more efficient check to detect inconsistencies in SUP requirements. Indeed, partial consistency checking simply identifies risky situations for pairs of SUPs that could be rt-inconsistent. We will however later show (see Lemma 3) that additional checks allow to lift witnesses of partial inconsistencies to witnesses of rt-inconsistencies.

For a SUP requirement R=SUP(P), a finite trace $\sigma \in \Sigma^*$, and $j \in \mathbb{N}$, we define the predicate $\text{TriggerAt}_R(\sigma, j)$ which holds if a trigger phase was just ended at step j. Formally, let $\mathcal{T}_R$ denote a deterministic timed automaton representing R. In addition, for $\mathcal{T}_R$ and $\sigma$, let $(s_i, v_i)_{i \in [0, |\sigma|]}$ denote the corresponding run. Then, $\text{TriggerAt}_R(\sigma, j)$ holds if, and only if, one of the following conditions holds:

Either $s_{j-1}$=trig, $\sigma_j \models P_{TEE}$, and $v_{j-1}(c) \geq P_{Tmin}$;

Or $s_{j-1}$=idle, $\sigma_j \models P_{TSE} \wedge P_{TEE}$ and $P_{Tmin}=0$;

Or $S_{j-1}$=act, $\sigma_j \models P_{AEE} \wedge P_{TSE} \wedge P_{TEE}$, $v_{j-1}(c) \geq P_{Amin}$ and $P_{Tmin}=0$;

Or $S_{j-1}$=delay, $\sigma_j \models P_{ASE} \wedge P_{AEE} \wedge P_{TSE} \wedge P_{TEE}$, $v_{j-1}(c) \geq P_{Lmin}$ and $P_{Amin}=P_{Tmin}=0$.

Note that the first case is the main one and the easiest one to understand: $\text{TriggerAt}_R(\sigma, j)$ holds if the timed automaton was in the state trig and $P_{TEE}$ just occurred while $P_{Tmin}$ time was spent during the trigger phase. Thus, the trigger phase has successfully ended. The other items treat the cases where the trigger phase ends within one step in the initial state, or simultaneously as the previous action phase is ending, and the case where both the previous action phase and the present trigger phase are done within the same step.

For SUP requirements $R_1=\text{SUP}(P_1)$, $R_2=\text{SUP}(P_2)$, $R=\text{SUP}(P)$, indices $j_1, j_2, k \in \mathbb{N}$, we define:

$$\text{Interfere}_{(R_1,R_2)}(j_1,j_2) = j_1 + (P_1)Lmin + (P_1)_{Amin} \geq j_2 + (P_2)_{Lmax} \wedge j_2 + (P_2)_{Lmin} + (P_2)_{Amin} \geq j_1 + (P_1)_{Lmax}$$

$$\text{Trig}_{(R_1,R_2),k}(\sigma) \exists j_1, j_2 \in \mathbb{N} : j_1 \leq k \wedge j_2 \leq k \wedge \text{TriggerAt}_{R_1}(\sigma, j_1) \wedge \text{TriggerAt}_{R_2}(\sigma, j_2) \wedge \text{Interfere}_{(R_1,R_2)}(j_1, j_2)$$

Figure 4:
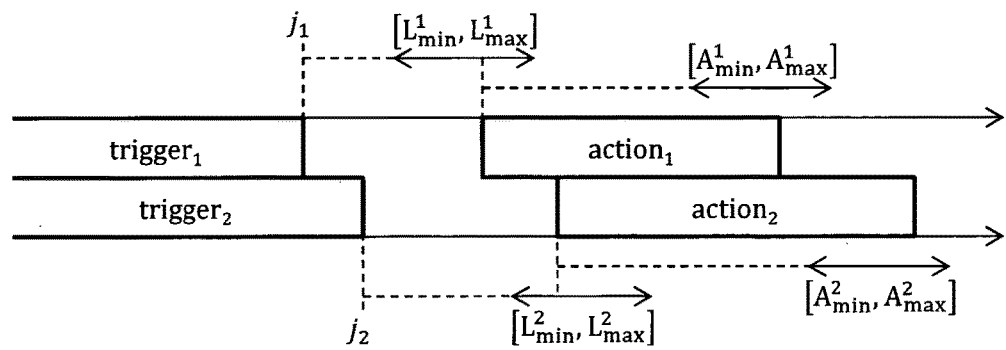
FIG. 4 shows a schematic representation illustrating the interference between action phases of two different SUP timed requirements after their trigger phases.

$\text{Interfere}_{(R_1,R_2)}(j_1, j_2)$ expresses the fact that if trigger phases of $R_1$ and $R_2$ are completed at steps $j_1$ and $j_2$ respectively, then their respective potential action phases necessarily overlap. $\text{Trig}_{(R_1,R_2),k}(\sigma)$ means that the trigger phases of $R_1$ and $R_2$ are completed by step k and their potential action phases overlap. FIG. 4 illustrates the interferences of the action phases ($\text{action}_1$ and $\text{action}_2$ in FIG. 4) of two timed requirements after their trigger phases ($\text{trigger}_1$ and $\text{trigger}_2$ in FIG. 4). Remark that if a is a prefix of p, then $\text{Trig}_{(R_1,R_2),k}(\sigma)$ implies $\text{Trig}_{(R_1,R_2),k}(\rho)$.

Consider SUP timed requirements $R_1$, $R_2$ and a set $\mathcal{R}_{inv}$, of SUP timed requirements. We say that $R_1$ and $R_2$ are partially consistent with respect to $\mathcal{R}_{inv}$ if:

$$\forall k \in \mathbb{N}, (\forall i \in \{1,2\}, \exists \sigma \in \Sigma^\infty, \sigma \models \mathcal{R}_{inv} \cup \{R_i\} \wedge \text{Trig}_{(R_1,R_2),k}(\sigma)) \Rightarrow (\exists \sigma \in \Sigma^\infty, \sigma \models \mathcal{R}_{inv} \cup \{R_1, R_2\} \wedge \text{Trig}_{(R_1,R_2),k}(\sigma)) \quad (1)$$

Partial consistency requires that for all $k \geq 1$, if traces for both timed requirements can be found in which the trigger is completed within k steps, and the timed requirement satisfied, then a single trace must exist that triggers and satisfies both timed requirements. Observe that, given set $\mathcal{R}_{inv}$, timed requirements $R_1, R_2$, a witness trace of partial inconsistency is a number $k \geq 0$ and two sequences $\sigma_1$ and $\sigma_2$ of length k, such that each $\sigma_i$ triggers both $R_1$ and $R_2$ and satisfies $R_i$, but there are no infinite traces that trigger both $R_1$ and $R_2$ within k steps and satisfy both.

As in [Bec19], to efficiently find witnesses of partial inconsistency, we may consider the following approximation. Given bounds $\alpha, \beta > 0$, timed requirements $R_1, R_2$ are $(\alpha, \beta)$-bounded partial consistent if:

$$\forall k \leq \alpha, (\forall i \in \{1,2\}, \exists \sigma \in \Sigma^\alpha, \sigma \models \mathcal{R}_{inv} \cup \{R_i\} \wedge \text{Trig}_{(R_1,R_2),k}(\sigma)) \Rightarrow (\exists \sigma \in \Sigma^{\alpha+\beta}, \sigma \models \mathcal{R}_{inv} \cup \{R_1, R_2\} \wedge \text{Trig}_{(R_1,R_2),k}(\sigma)) \quad (2)$$

Thus, the approximation consists in looking for witness traces of bounded length for the failure of Equation (2), but remark that witness traces for the failure of Equation (2) are not witness traces of the failure of Equation (1) which require infinite traces.

Example 3

We consider again the timed requirements of Example 2. Timed requirements P1 and P2 are not partially consistent under empty $\mathcal{R}_{inv}$, since there are traces that trigger both timed requirements, but as soon as their action phases overlap, both cannot be fulfilled. Under timed requirement P3, timed requirements P1 and P2 cannot interfere, so that with $\mathcal{R}_{inv}=\text{SUP}(P3)$, those two timed requirements are partially consistent.

There are a few differences with the original definition of partial consistency of [Bec19]. First, partial consistency of [Bec19] only checks the very first trigger of the traces, that is, the TriggerAt formula is used to define the position of the trigger of the first phase only. In our case, we consider also the triggers of later phases. In fact, $\text{TriggerAt}(\sigma, j)$ is true whenever j is the end of the trigger of some phase of $\sigma$. Thus, we can detect more subtle inconsistencies.

The second difference is that the bounded approximation in [Bec19] checks for the existence of a lasso-shaped execution in the timed automata that recognize the SUP timed requirements. The advantage of this is that such a lasso describes an infinite execution, so if partial consistency holds, so does the bounded approximation; while the converse is not true. In our case, we do not look for a lasso in the left part of Equation (2), so this implication does not hold. We do prove, on the other hand, that rt-consistency implies Equation (2) (see Lemma 3 below).

Third, in [Bec19], $\mathcal{R}_{inv}$ contains only a specific type of timed requirements called invariants. In our case, $\mathcal{R}_{inv}$ is an arbitrary subset of the set of timed requirements.

B. Detailed Description of the Testing Method

Figure 5:
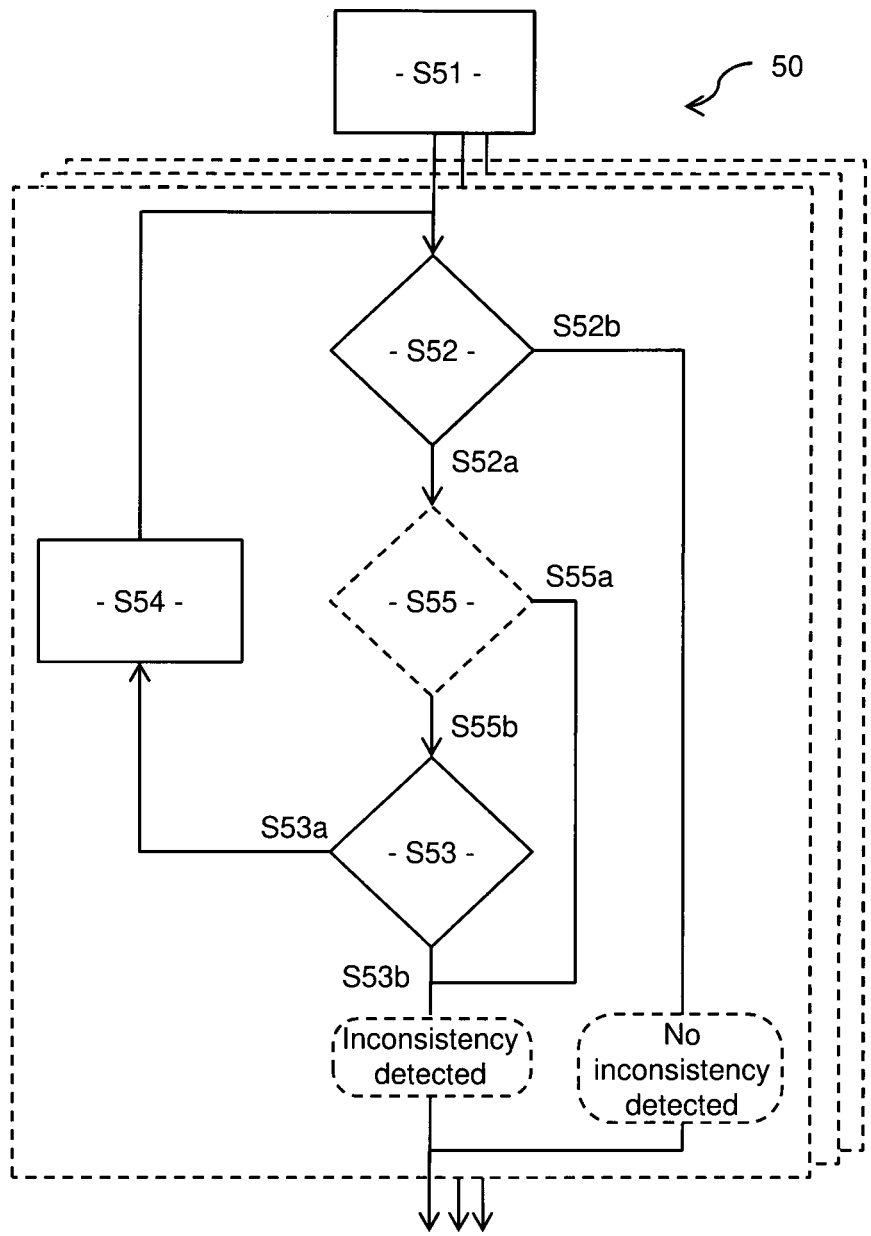
FIG. 5 shows a diagram representing the main steps of an exemplary embodiment of a testing method.

FIG. 5 represents the main steps of a method 50 for testing the operation of a target computer system (not represented in the figures), the operation of said target computer system being constrained by a set $\mathcal{R}$ of $N_{TR}$ timed requirements, $|\mathcal{R}|=N_{TR} \geq 3$.

The testing method 50 is carried out by a testing computer system (not represented in the figures). In preferred embodiments, the testing computer system comprises one or more processors (which may belong to a same computer or to different computers) and storage means (magnetic hard disk, optical disk, electronic memory, or any computer readable storage medium) in which a computer program product is stored, in the form of a set of program-code instructions to be executed in order to implement all or part of the steps of the testing method 50. Alternatively, or in combination thereof, the testing computer system can comprise one or more programmable logic circuits (FPGA, PLD, etc.), and/or one or more specialized integrated circuits (ASIC), etc., adapted for implementing all or part of said steps of the testing method 50. In other words, the testing computer system comprises a set of means configured by software (specific computer program product) and/or by hardware (processor, FPGA, PLD, ASIC, etc.) to implement the steps of the testing method 50.

As illustrated by FIG. 5, the testing method 50 comprises a step S51 of defining subsets of $K_{TR}$ timed requirements of the set $\mathcal{R}$, $2 \leq K_{TR} < N_{TR}$. Preferably, all subsets have initially the same number of timed requirements but, in some embodiments, the initial number of timed requirements may vary from one subset to another. The subsets are all different, none of the subsets defined is included or identical to another subset. However, a given timed requirement may be included in a plurality of subsets. Preferably, the union of all the subsets defined corresponds to the set $\mathcal{R}$.

Then, as illustrated in FIG. 5, the testing method 50 comprises additional steps which may be iterated for each subset of a plurality of subsets. Preferably, said steps are executed for all the subsets defined, however it is also possible to execute these steps only on some of the subsets.

As illustrated by FIG. 5, for each subset of the plurality of subsets, the following steps are iterated:
- a step S52 of searching for an execution sequence of the target computer system, referred to as "witness trace", satisfying a criterion for detecting a conflict between timed requirements of the subset;
- when a witness trace is found (reference S52a in FIG. 5):
  a step S53 of searching for a contradicting timed requirement among the timed requirements of the set $\mathcal{R}$ which are not present in the subset, which prevents the witness trace to occur when considered with the subset;
- when a contradicting timed requirement is found (reference S53a in FIG. 5): a step S54 of augmenting the subset by including the contradicting timed requirement in the subset.

The step S52 of searching for a witness trace satisfying the conflict detection criterion between timed requirements of the subset corresponds to performing an inconsistency check on the subset. The conflict detection criterion may use different notions of inconsistency checking, such as rt-inconsistency checking or partial inconsistency checking, and the witness trace is an execution sequence which demonstrates the inconsistency. Also, in some cases (see e.g. subsection B.2), more than one witness trace may be found, depending e.g. on the conflict detection criterion considered.

If no witness trace is found for the considered subset (reference S52b in FIG. 5), then no inconsistency of the subset is detected, and the execution of the different steps S52, S53 and S54 stops for this subset.

In turn, if a witness trace is found for the considered subset (reference S52a in FIG. 5), then the testing method 50 continues with step S53 of searching for a contradicting timed requirement in the timed requirements of the set $\mathcal{R}$ which are not present in the subset.

Basically, a contradicting timed requirement corresponds to a timed requirement which prevents the witness trace to occur when considered with the considered subset. Hence the contradicting timed requirement is a timed requirement that is violated by the witness trace before any timed requirement of the considered subset is violated.

If no contradicting timed requirement is found for the witness trace (reference S53b in FIG. 5), then an inconsistency of the subset is detected, and the execution of the different steps S52, S53 and S54 stops for this subset.

In turn, if a contradicting timed requirement is found for this witness trace (reference S53a in FIG. 5), then the testing method 50 continues with step S54 of augmenting the subset with the contradicting timed requirement, which consists in including the contradicting timed requirement in the considered subset, such that the number of timed requirements of this subset is incremented.

After step S54 of augmenting the considered subset, step S52 of searching a witness is executed again on the augmented subset, and so on.

As can be seen in FIG. 5, the execution of the different steps S52, S53 and S54 may stop e.g. when no witness trace is found or when no contradicting timed requirement is found for a given witness trace. It should be noted that no contradicting timed requirement can be found if the considered subset has been augmented up to the size of the set $\mathcal{R}$, i.e. when the number of timed requirements of this subset is equal to $N_{TR}$ and there are no timed requirements of the set which are not present in this subset.

An inconsistency of the set $\mathcal{R}$ (which defines the operation of target computer system) is detected when a witness trace is found for at least one subset and no contradicting timed requirement is found for said witness trace. The testing method 50 may stop once at least one inconsistency is detected for at least one subset, or it may continue until e.g. all the subsets are processed.

In some embodiments, and as illustrated in FIG. 5, the testing method 50 may also comprise a step S55 of evaluating whether a stop criterion is satisfied. For instance, it is possible to consider a higher bound $K_{TRmax}$ ($K_{TRmax} < N_{TR}$) on the size of the subset, such that the stop criterion is satisfied when the size of the subset reaches $K_{TRmax}$. Other stop conditions, or a combination thereof, may be considered in the stop criterion. In FIG. 5, the step S55 of evaluating the stop criterion is executed after step S52 of searching for a witness trace. If the stop criterion is not satisfied (reference S55b in FIG. 5), then the testing method 50 proceeds with step S53. In turn, if the stop criterion is satisfied (reference S55a in FIG. 5), then the iterations stop for this subset. However, other positions are possible, and the testing method 50 may also include more than one step S55 of evaluating a stop criterion, evaluating different respective stop conditions.

In the sequel, we describe specific preferred embodiments of testing method 50. It is emphasized that the present invention is not limited to the below exemplary embodiments. Variants of these embodiments are also within the scope of the present invention.

B.1. Embodiment 1: Incremental RT-Consistency Checking

In this subsection, we present an embodiment of the testing method 50 for rt-consistency checking. This embodiment uses computation tree logic, CTL, model checking.

Consider a set $\mathcal{R} = \{R_i\}_{i \in I}$ given as timed automata. As discussed above, in the product of $R_i$, the set of error states is the set of states in which at least one timed automaton is in its error state. Thus, given trace $\sigma \in \Sigma^*$, the predicate err is false in the state reached by reading $\sigma$ in $\otimes \mathcal{R}$ if, and only if, $\sigma \models \mathcal{R}$. Rt-inconsistency checking then reduces to checking whether a finite trace satisfying $\neg$err can be found such that err is inevitable from the last state. Accordingly, the conflict detection criterion can be expressed by the following CTL formula to be checked in $\otimes \mathcal{R}$:

$$E[\neg err\ U(\vdash err \wedge AFerr)].$$

We do not formally define CTL and its semantics but only explain this specific formula. This formula says that there exists a finite execution p in which $\neg$err holds (that is, $\forall 0 \leq i \leq |\rho|, \rho_i \models \neg err$), such that all continuations from state $\rho_{|\rho|-1}$ eventually lead to err, that is, err is inevitable from the last state of $\rho$.

If the formula is true, then there exists a finite trace $\sigma$ such that $\sigma \models \mathcal{R}$ (since err is false), but for all infinite traces $\sigma' \in \Sigma^\infty$, $\sigma\sigma'$ sets err to true eventually. In other terms, $\sigma\sigma' \not\models \mathcal{R}$ for all $\sigma' \in \Sigma^\infty$, or equivalently $\sigma' \not\models \mathcal{R}$, witnessing that $\mathcal{R}$ is rt-inconsistent. Such a finite trace $\sigma$, if it exists, corresponds to a witness trace for the rt-inconsistency of the set $\mathcal{R}$, searched for in step S52 of the testing method 50. Basically, the witness trace $\sigma$ satisfies all the timed requirements of the subset, but the witness trace has no extension that satisfies all said timed requirements of the subset.

The advantage of defining the conflict detection criterion using a CTL formula is that there exist efficient model checking tools (such as NuSMV) for checking if a finite state target computer system satisfies such a CTL formula. Additionally, if the formula holds, such model checking tools will also return a run witnessing this CTL formula, i.e. the witness trace searched for in step S52 of the testing method 50.

It should be noted that this CTL formula, together with model checking tools, can be used directly on the whole set $\mathcal{R}$, without considering subsets as discussed in reference to FIG. 5, if the size of the set $\mathcal{R}$ is not too large.

When the size of the set $\mathcal{R}$ is too large, then we can consider subsets of the set $\mathcal{R}$, as discussed above in reference to FIG. 5. The resulting check can only provide partial guarantee on rt-inconsistency. Indeed if $\mathcal{R}' \subseteq \mathcal{R}$, consistency of $\mathcal{R}$ does not imply consistency of $\mathcal{R}'$, nor the opposite. Nevertheless, rt-inconsistencies can be detected, as shown in the next lemma.

{Lemma 1}

Let $\sigma \in \Sigma^*$ be a witness trace for the rt-inconsistency of $\mathcal{R}' \subseteq \mathcal{R}$. If $\sigma \models \mathcal{R}$, then a is also a witness trace for the rt-inconsistency of $\mathcal{R}$.

{Proof}

In fact, if $\sigma$ is a witness trace of rt-inconsistency in $\mathcal{R}'$ i.e. $\sigma \models \mathcal{R}'$ but $\sigma \not\models \mathcal{R}'$, it also implies $\sigma \not\models \mathcal{R}$. If additionally $\sigma \models \mathcal{R}$, then we can conclude that $\sigma$ is a witness trace of rt-inconsistency of $\mathcal{R}$.

Given the set $\mathcal{R}$ and a bound $K_{TRmax} \leq |\mathcal{R}|$, we consider subsets $\mathcal{R}'$ of the set $\mathcal{R}$ of size up to $K_{TRmax}$, starting for instance with subsets of size 2 ($K_{TR}=2$). If a subset $\mathcal{R}' \subseteq \mathcal{R}$ is found to be rt-inconsistent with a witness trace $\sigma$, then we check whether $\sigma \models \mathcal{R} \setminus \mathcal{R}'$. If this is the case (which implies that no contradicting timed requirement can be found), we can conclude using Lemma 1 that the set $\mathcal{R}$ is rt-inconsistent and that $\sigma$ is a witness trace of this rt-inconsistency.

Otherwise (if $\sigma \not\models \mathcal{R} \setminus \mathcal{R}'$), we select a contradicting timed requirement $R \in \mathcal{R} \setminus \mathcal{R}'$ such that $\sigma \not\models R$, and restart the analysis with $\mathcal{R}' \cup \{R\}$ (i.e. the subset $\mathcal{R}'$ is augmented with the contradicting timed requirement R). It should be noted that if $\mathcal{R}' \cup \{R\}$ is inconsistent, then the trace $\sigma$ identified during the previous iteration cannot be a witness trace for $\mathcal{R}' \cup \{R\}$ since it violates R. This ensures that a new timed requirement will be added to the subset at each iteration. If no confirmed witness traces are found (i.e. either no further witness trace is found or there always exists a contradicting timed requirement), then the iterations may stop, and no rt-inconsistency is found for this subset. If $K_{TRmax}=|\mathcal{R}|$, then one can conclude that the set R is rt-consistent. Otherwise ($K_{TRmax}<|\mathcal{R}|$), the check is only partial. In order to increase the precision (to have a better chance to detect rt-inconsistencies), one can increase the bound $K_{TRmax}$. In order to reduce the number of cases to check, thus giving up on completeness, one might restrict only to some subsets, for instance making sure that each timed requirement is covered by at least one subset.

An exemplary pseudo-code implementation for the present embodiment is given below, in the case where $K_{TR}=2$. In the example below, we write $\mathcal{R}' \models E[\neg err\ U(\neg err \wedge AFerr)]$ for a subset $\mathcal{R}'$ of timed automata and the CTL formula to mean that the product of these timed automata satisfies the CTL formula (i.e. there exists a witness trace satisfying the conflict detection criterion). It should be noted that, in order to avoid checking the same subsets of the set $\mathcal{R}$ several times (e.g. when augmenting the subsets), one can store the subsets seen so far and break the while loop when a subset $\mathcal{R}$ has already been processed.

```
for all pairs {R₁, R₂} ⊆ 𝓡 do
    𝓡' ← {R₁, R₂} // subset
    while |𝓡'| ≤ K_{TRmax} and 𝓡' ⊨ E[¬err U(¬err∧AFerr)] do
        σ ← witness trace for E[¬err U(¬err∧AFerr)]
        if ∃R ∈ 𝓡, σ ⊭ R then
            𝓡' ← 𝓡' ∪ R // subset is augmented
        else
            return σ // rt-inconsistency of 𝓡 detected
        end
    end
end
return ∅ // no witness trace found
```

B.2. Embodiment 2: Incremental Partial-Consistency Checking

In this subsection, we present an embodiment of the testing method 50 for partial consistency checking. This embodiment uses timed requirements modeled as a Simplified Universal Patterns, SUPs.

Ideally, we would like to check Equation (2) for all pairs $\{R_1, R_2\}$ of requirements with respect to $R_{inv}=\mathcal{R}\setminus\{R_1, R_2\}$. In fact, considering such a subset $\mathcal{R}_{inv}$ makes sure that traces do not trivially violate timed requirements.

This is costly in general, and the present embodiment starts with an empty $\mathcal{R}_{inv}$ and let it grow incrementally by adding timed requirements as needed. Hence, in the present embodiment, the subset (as defined in reference to FIG. 5) corresponds to $\mathcal{R}_{inv}\cup\{R_1, R_2\}$ (which is initially equal to $\{R_1, R_2\}$ since $\mathcal{R}_{inv}$ is initially empty, such that $K_{TR}=2$). For the present embodiment, the conflict detection criterion is satisfied when Equation (2) above fails and searching for witness traces may use e.g. a Satisfiability Modulo Theories, SMT, solver.

Given the set $\mathcal{R}$, a pair $\{R_1, R_2\}$, a subset $\mathcal{R}_{inv}\subseteq\mathcal{R}\setminus\{R_1, R_2\}$, integer parameters $\alpha$, $\beta>0$, the $(\alpha, \beta)$-bounded partial-consistency checking consists in verifying Equation (2). If the check is negative (i.e. Equation (2) fails), then the conflict detection criterion is satisfied and there exists $k\leq\alpha$ and a pair of traces $\sigma_1$, $\sigma_2$ satisfying the left part of Equation (2) ($\sigma_i$ is a witness trace for the case $i\in\{1,2\}$), while the right part of Equation (2) is not satisfiable. Hence, in the present case, there are two witness traces $\sigma_1$, $\sigma_2$ found during step S52 of the testing method 50. We check whether $\sigma_i|=\mathcal{R}$ for some $i\in[1,2]$ in which case the witness trace is returned, and a partial inconsistency is detected. Otherwise, we select a timed requirement $\mathcal{R}'\in\mathcal{R}\setminus\{\mathcal{R}_{inv}\cup\{R_1, R_2\}\}$ such that and we add it to $\mathcal{R}_{inv}$ (i.e. the subset $\mathcal{R}_{inv}\cup\{R_1, R_2\}$ is augmented with the contradicting timed requirement R'), and we restart the analysis with $\{R_1, R_2\}$ and $\mathcal{R}_{inv}$. Subsequent iterations may discard the witness trace $\sigma_i$ and look for other traces.

An exemplary pseudo-code implementation for the present embodiment is given below.

```
for all pairs [R₁, R₂] ⊆ ℛ do
    ℛ inv ← ∅ // subset corresponds to ℛ inv ∪ {R₁, R₂}
    while Equation (2)fails do
        (σ₁, σ₂) ← witness trace for the premise of (2) for some k
            ≤ α
        if ∃i ∈ {1,2}, σᵢ|=ℛ then
            return σᵢ // rt-inconsistency of ℛ detected
        else
            if ℛ = ℛ inv ∪ {R₁, R₂} then
                break
            else
                Choose R' ∈ ℛ such that σᵢ|≠R' for some i ∈ {1,2}
                ℛ inv ← ℛ inv ∪ R' // subset ℛ inv ∪ {R₁ R₂] is
                    augmented
            end
        end
    end
end
return ∅ // no witness trace found
```

Before proving the absence of false positives as output to the present embodiment, we prove an intermediate lemma relating to some witness of bounded-partial inconsistency and rt-inconsistency.

{Lemma 2}

Let $\sigma_1$, $\sigma_2$ and k be witnesses of bounded partial inconsistency for $\mathcal{R}_{inv}\subseteq\mathcal{R}$, i.e. counterexamples of Equation (2). For any i, if additionally $\sigma_i|=\mathcal{R}$, then $\sigma_i$ is also a witness trace for the rt-inconsistency of $\mathcal{R}$.

{Proof}

Suppose $\sigma_1$, $\sigma_2\in\Sigma^\alpha$ and $k\leq\alpha$ witness $(\alpha, \beta)$-bounded partial inconsistency, thus $\forall i\in[1,2]$, $\sigma_i\in\Sigma^\alpha$, $\Sigma\alpha$, $\sigma_i|=\mathcal{R}_{inv}\cup\{R_i\}\wedge\mathrm{Trig}_{(R_1,R_2),k}(\sigma_i)$ but there is no $\sigma\in\Sigma^{\alpha+\beta}$ such that $\sigma|=\mathcal{R}_{inv}\cup\{R_1, R_2\}\wedge\mathrm{Trig}_{(R_1, R_2),k}(\sigma)$. Suppose by contradiction that $\sigma_i$ is not a witness trace of rt-inconsistency, i.e. $\sigma_i|=\mathcal{R}$. By definition, there is an infinite continuation $\sigma'\in\Sigma^\infty$ such that $\sigma\sigma'|=\mathcal{R}$. Let $\rho$ be the prefix of $\sigma\sigma'$ of length $\alpha+\beta$. Since $\sigma$ is a prefix of $\rho$ and $\mathrm{Trig}_{(R_1,R_2),k}(\sigma)'$ we also get $\mathrm{Trig}_{(R_1,R_2),k}(\rho)$ Now the right part of Equation (2) is false, while $\rho\in\Sigma^{\alpha+\beta}$ and $\rho|=\mathcal{R}\supseteq\mathcal{R}_{inv}\cup\{R_1, R_2\}$ and this is a contradiction, such that we can conclude that $\sigma_i|\not\models\mathcal{R}$.

The following lemma then shows that witness traces returned by the present embodiment are witnesses to rt-inconsistency.

{Lemma 3}

Let $\mathcal{R}$ be a set of SUP requirements, and $\sigma$ be a finite trace returned by the present embodiment (at line 6 of the pseudo-code), then $\sigma$ is a witness trace for rt-inconsistency for $\mathcal{R}$.

{Proof}

Assume that the present embodiment returned a witness trace $\sigma\in\Sigma^*$ for the outer iteration with $R_1, R_2\in\mathcal{R}$, and inner iteration $\mathcal{R}_{inv}\subseteq\mathcal{R}$. The present embodiment ensures that $\sigma|=\mathcal{R}$ (line 5 of the pseudo-code above). We then use Lemma 2 to conclude that $\sigma$ is a witness trace for rt-inconsistency for the set $\mathcal{R}$.

B.3. Embodiment 3: Partial RT-Consistency Checking

In this subsection, we present an embodiment of the testing method 50 for partial consistency checking. Basically, we divide the rt-consistency checking problem into several smaller problems. Intuitively, for all (or part of) subsets of a given set $\mathcal{R}$ of requirements, we check an absence of conflict involving all the timed requirements in the subset. Notice that a divided problem for a large subset (possibly the original set itself) would be still simpler than the original problem, since each divided problem considers only the case where all the timed requirements in the subset conflict simultaneously.

For a timed requirement represented by a deterministic timed automaton $\mathcal{T}=(S, S_0, AP, x, T, E)$ and a trace $\sigma\in\Sigma^*$, let $(s_i, v_i)_{i\in[0,|\sigma|]}$ denote a corresponding run. Then, for a transition $t\in T$ and a natural number $k\in\mathbb{N}$, we define:

$$\mathrm{ErrAt}(\mathcal{T},t,\sigma,k)=(tgt(t)\in E)\wedge(src(t)=S_k)\wedge(v_k|=\mathrm{guard}(t)).$$

Intuitively, $\mathrm{ErrAt}(\mathcal{T}, t, \sigma, k)$ holds if transition t, leading to an error state, is available after step k along a trace $\sigma$ (for some valuation of the atomic propositions).

For a set of timed automata $\mathcal{R}=\{\mathcal{T}_i=(S_i, S_{i,0}, AP_i, x_i, T_i, E_i)\}_{i\in\mathcal{I}}$ that represents a set of timed requirements, we define:

$$\mathrm{conflict}(\mathcal{R},\sigma,k)=\exists(t_i)_{i\in\mathcal{I}}\in(\times T_i)^{i\in\mathcal{I}},(|=\vee_i^{\mathcal{I}}\mathrm{bool}_i(t_i))$$
$$\wedge\forall\mathcal{I}'\subset\mathcal{I},\mathcal{I}'\neq|\to\neg(|=\vee_i^{\mathcal{I}'}\mathrm{bool}_i(t_i))\wedge\forall\mathcal{T}_i\in\mathcal{R},\mathrm{ErrAt}(\mathcal{T}\,t_i,\sigma,k).$$

Intuitively, $\mathrm{conflict}(\mathcal{R}, \sigma, k)$ holds if for all $\sigma'\in\Sigma$, $\sigma_{...k}\sigma'$ takes some transition into an error state at step k+1. In other words, after an execution represented by $\sigma_{...k}$, all the timed requirements in R conflict each other, and any execution at step k+1 will violate at least one of the time requirements in $\mathcal{R}$. Moreover, in $\mathrm{conflict}(\mathcal{R}, \sigma, k)$, we only consider conflicts among all of the timed requirements in $\mathcal{R}$, by specifying the condition $\neg(|=\vee_i^{\mathcal{I}'}\mathrm{bool}_i(t_i))$. That enables incremental checking of conflict for each subset of $\mathcal{R}$.

Now we define a notion of partial rt-consistency. For a set $\mathcal{R}$ of timed automata and a subset $\mathcal{R}' \subseteq \mathcal{R}$, $\mathcal{R}'$ is α-bounded partially rt-inconsistent with $\mathcal{R}_{inv} \subseteq \mathcal{R} \setminus \mathcal{R}'$ if, and only if $$\exists k \leq \alpha, \exists \sigma \in \Sigma^k, \sigma |= \{\mathcal{R}' \cup \mathcal{R}_{inv}\} \wedge \text{conflict}(\mathcal{R}', \sigma, k). \quad (3)$$

Furthermore, for $K_{TRmax} \in [1, |\mathcal{R}|]$, we define $K_{TRmax}$-partial rt-consistency as follows:

$$\forall \mathcal{R}' \subseteq \mathcal{R}, |\mathcal{R}'| \leq K_{TRmax} \rightarrow (\forall k \leq \alpha, \forall \sigma \in \Sigma^k, \sigma |= \mathcal{R} \rightarrow \neg \text{conflict}(\mathcal{R}', \sigma, k)).$$

$K_{TRmax}$-partial rt-consistency ensures that there is no conflict among a subset of R of size 1 to $K_{TRmax}$ up to step α. Thus, $|\mathcal{R}|$-partial rt-consistency implies rt-consistency up to step α, and $|\mathcal{R}|$-partial rt-inconsistency implies rt-inconsistency.

In the present embodiment, the conflict detection criterion is satisfied when Equation (3) above fails and searching for witness traces may use e.g. a SMT solver. Basically, the witness trace σ is such that it satisfies all the timed requirements of the subset and, for all extensions of the witness trace, at least one timed requirement of the subset will always be violated at next step.

The subset (as defined in reference to FIG. 5) corresponds to $\mathcal{R}_{inv} \cup \mathcal{R}'$ (which is initially equal to $\mathcal{R}'$ since $\mathcal{R}_{inv}$ is initially empty).

An exemplary pseudo-code implementation for the present embodiment is given below. A witness trace σ returned by the present embodiment is clearly a witness of rt-inconsistencies of bounded size for a subset $\mathcal{R}$. Since the present embodiment ensures that a satisfies $\mathcal{R}$ (line 5 in the pseudo-code below), again using Lemma 1 we can conclude that σ is a witness trace of rt-inconsistency.

```
for all R' ⊆ R such that |R'| ≤ K_TR do
    R_inv ← ∅ // subset corresponds to R_inv ∪ R'
    while Equation (3)fails do
        (k, σ) ← k ≤ α and σ witness trace for Equation (3)
        if σ|=R then
            return σ // inconsistency detected
        else
            if R = R_inv ∪ R' then
                break
            else
                Choose R ∈ R such that σ|≠R
                R_inv ← R_inv ∪ R // subset R_inv ∪ R' is augmented
            end
        end
    end
end
return ∅ // no witness trace found
```

To illustrate how partial rt-consistency checking works, consider the following SUP requirements:

$R_1$: $(p, \text{true}, \text{true})[0; 0] \xrightarrow{[1;1]} (q, \text{true}, r)[1; 1]$;

$R_2$: $(p, \text{true}, \text{true})[0; 0] \xrightarrow{[2;2]} (\neg q, \text{true}, \text{true})[0; 0]$;

$R_3$: $(p, \text{true}, \text{true})[0; 0] \xrightarrow{[4;4]} (r, \text{true}, \text{true})[0; 0]$.

Let $\mathcal{T}_1$, $\mathcal{T}_2$ and $\mathcal{T}_3$ denote timed automata representing $R_1$, $R_2$ and $R_3$ respectively. For each timed automaton, there exists the following transitions into error state:

$\mathcal{T}_1$: $(\text{delay}_1, c_1=1, \neg q, \text{err}_1)$, $(\text{act}_1, c_1=1, \neg r, \text{err}_1)$;
$\mathcal{T}_2$: $(\text{delay}_2, c_2=2, q, \text{err}_2)$;
$\mathcal{T}_3$: $(\text{delay}_3, c_3=4, \neg r, \text{err}_3)$.

A tuple t=(s, clock, bool, s') denotes a transition from state s to state s' with time condition clock and Boolean condition bool. In other words, src(t)=s, tgt(t)=s', guard(t)=clock and bool(t)=bool. For example, $(\text{delay}_1, c_1=1, \neg q, \text{err}_1)$ denotes that if $\mathcal{T}_1$ is in the state $\text{delay}_1$ and the value of its clock is 1 at some step i, and the condition q does not hold at step i+1 then, $\mathcal{T}_1$ transitions to the error state $\text{err}_1$ at step i+1.

In 2-partial rt-consistency checking, the subsets $\{R_1, R_2\}$, $\{R_2, R_3\}$, $\{R_1, R_3\}$ are checked. Let $t_1^1, t_2^1, t_1^2, t_1^3$ denote $(\text{delay}_1, c_1=1, \neg q, \text{err}_1)$, $(\text{act}_1, c_1=1, \neg r, \text{err}_1)$, $(\text{delay}_2, c_2=2, q, \text{err}_2)$, $(\text{delay}_3, c_3=4, \neg r, \text{err}_3)$ respectively. For the subset $\{R_1, R_2\}$, there exists a pair of transitions $(t_1^1, t_1^2)$ which satisfies the condition $|=\text{bool}(t_1^1) \vee \text{bool}(t_1^2)$ since $|=\neg q \vee q$ holds. Thus, if there exists a trace σ and k∈ℕ that satisfies $\text{ErrAt}(\mathcal{T}_1, t_1^1, \sigma, k) \wedge \text{ErrAt}(\mathcal{T}_2, t_1^2, \sigma, k)$ then, conflict$(\{R_1, R_2\}, \sigma, k)$ holds. In that case, if σ satisfies $R_1$, $R_2$ and $R_3$ until step k, the timed requirements are rt-inconsistent.

However, by definition of ErrAt, $\mathcal{T}_1$ must be in the state $\text{delay}_1$ and $c_1=1$, and $\mathcal{T}_2$ must be in the state $\text{delay}_2$ and $c_2=2$, at step k. It will never occur since $\mathcal{T}_1$ and $\mathcal{T}_2$ transition to $\text{delay}_1$ (resp. $\text{delay}_2$) simultaneously and the value of their clock are always same. In practice, that may be automatically checked by an SMT solver until step α. Thus, $R_1$ and $R_2$ are partially rt-consistent. For $\{R_2, R_3\}$ and $\{R_1, R_3\}$, there is no pair (t, t') that satisfies $|=\text{bool}(t) \vee \text{bool}(t')$. Therefore, the timed requirements $R_1$, $R_2$ and $R_3$ are 2-partially rt-consistent.

In 3-partial rt-consistency checking, the original set $\{R_1, R_2, R_3\}$ is checked. In this case, there exists a triplet of transitions $(t_1^1, t_1^2, t_1^3)$ that satisfies $|=\text{bool}(t_1^1) \vee \text{bool}(t_1^2) \vee \text{bool}(t_1^3)$. However, the triplet does not satisfy the condition $|\approx\text{bool}(t_1^1) \vee \text{bool}(t_1^2)$ since $|=\neg q \wedge q$ holds. Then, we can conclude that $t_1^1, t_1^2$ and $t_1^3$ do not become available at the same time, since it is already confirmed in 2-partial rt-consistency checking that there is no trace σ and k∈ℕ that satisfies $\text{ErrAt}(\mathcal{T}_1, t_1^1, \sigma, k) \vee \text{ErrAt}(\mathcal{T}_2, t_1^2, \sigma, k)$. Thus obviously, there is no a and k that satisfies $\text{ErrAt}(\mathcal{T}_1, t_1^1, \sigma, k) \wedge \text{ErrAt}(\mathcal{T}_2, t_1^2, \sigma, k) \wedge \text{ErrAt}(\mathcal{T}_3, t_1^3, \sigma, k)$. Therefore, $R_1$, $R_2$ and $R_3$ are 3-partially rt-consistent. As a result, the timed requirements $R_1$, $R_2$ and $R_3$ are rt-consistent.

REFERENCES

[AD90] Rajeev Alur and David L. Dill. "*Automata for modeling real-time systems*". In Mike Paterson, editor, Proceedings of the 17th International Colloquium on Automata, Languages and Programming (ICALP'90), volume 443 of LNCS, pages 322-335. Springer, 1990.

[Bec19] Jan Steffen Becker. "*Analyzing consistency of formal requirements*". In Proceedings of the 18th International Workshop on Automated Verification of Critical Systems (AVOCS'18). EASST, 2019.

[PHP11] Amalinda Post, Jochen Hoenicke, and Andreas Podelski. "*Rt-inconsistency: a new property for real-time requirements*". In Proceedings of the 14th International Conference on Fundamental Approaches to Software Engineering (FASE'11), volume 6603 of LNCS. Springer, 2011.

The invention claimed is:

1. A computer implemented method for testing the operation of a target computer system, said operation of the target computer system being constrained by a set of timed requirements, wherein said method comprises defining subsets of timed requirements of the set, and for each subset of a plurality of subsets, and wherein said method comprises:

searching for an execution sequence of the target computer system, referred to as witness trace, satisfying a criterion for detecting a conflict between timed requirements of the subset;

when a witness trace is found: searching for a contradicting timed requirement among the timed requirements of the set which are not present in the subset, which prevents the witness trace to occur when considered with the subset;

when a contradicting timed requirement is found: augmenting the subset by including the contradicting timed requirement in the subset;

wherein an inconsistency of the operation of the target computer system constrained by the set of timed requirements is detected when a witness trace is found for at least one subset and no contradicting timed requirement is found for said witness trace.

2. The method according to claim 1, wherein the subset is augmented with contradicting timed requirements only up to a predetermined number of timed requirements.

3. The method according to claim 1, wherein the criterion for detecting a conflict is satisfied when an rt-inconsistency is detected or when a partial inconsistency is detected.

4. The method according to claim 1, wherein, the conflict detection criterion is expressed using Computation Tree Logic, CTL, and searching for a witness trace uses a model checking tool.

5. The method according to claim 1, wherein, searching for a witness trace uses a Satisfiability Modulo Theories, SMT, solver.

6. The method according to claim 1, wherein each timed requirement is modeled as a timed automaton.

7. The method according to claim 1, wherein each timed requirement is modeled as a Simplified Universal Pattern, SUP.

8. A non-transitory computer-readable storage medium comprising instructions which, when executed by at least one processor, configure said at least one processor to carry out the method according to claim 1.

9. A testing computer system for testing the operation of a target computer system, said testing computer system comprising at least one processor configured to carry out the method according to claim 1.

* * * * *